United States Patent
Osanai et al.

(10) Patent No.: US 7,240,183 B2
(45) Date of Patent: Jul. 3, 2007

(54) SYSTEM AND METHOD FOR DETECTING INSTRUCTION DEPENDENCIES IN MULTIPLE PHASES

(75) Inventors: Takeki Osanai, Kanagawa (JP); Kenji Iwamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 211 days.

(21) Appl. No.: 11/140,847

(22) Filed: May 31, 2005

(65) Prior Publication Data
US 2006/0271767 A1    Nov. 30, 2006

(51) Int. Cl.
*G06F 7/04* (2006.01)
(52) U.S. Cl. .................... 712/216; 712/225; 711/210
(58) Field of Classification Search ............... 712/216, 712/225; 711/210
See application file for complete search history.

(56) References Cited

U.S. PATENT DOCUMENTS

| | | | |
|---|---|---|---|
| 5,434,987 A * | 7/1995 | Abramson et al. ......... 712/226 |
| 5,644,752 A * | 7/1997 | Cohen et al. ............... 711/122 |
| 5,724,536 A * | 3/1998 | Abramson et al. ......... 712/216 |
| 6,360,298 B1 | 3/2002 | Osanai et al. | |
| 6,389,527 B1 | 5/2002 | Raam et al. | |
| 6,804,759 B2 * | 10/2004 | Luick ....................... 711/169 |

* cited by examiner

*Primary Examiner*—William M. Treat
(74) *Attorney, Agent, or Firm*—Law Offices of Mark L. Berrier (57) ABSTRACT

Systems and methods for determining dependencies between processor instructions in multiple phases. In one embodiment, a partial comparison is made between the addresses of a sequence of instructions. Younger instructions having potential dependencies on older instructions are suspended if the partial comparison yields a match. One or more subsequent comparisons are made for suspended instructions based on portions of the addresses referenced by the instructions that were not previously compared. If subsequent comparisons determine that the addresses of the instructions do not match, the suspended instructions are reinstated and execution of the suspended instructions is resumed. In one embodiment, data needed by suspended instructions is speculatively requested in case the instructions are reinstated.

21 Claims, 6 Drawing Sheets

SYSTEM AND METHOD FOR DETECTING INSTRUCTION DEPENDENCIES IN MULTIPLE PHASES

BACKGROUND OF THE INVENTION

1. Technical Field

The invention relates generally to computing systems, and more particularly to systems and methods for detecting dependencies between processor load/store instructions in multiple phases in order to increase the performance of high speed processors.

2. Related Art

Often, the order of execution of a sequence of instructions by a processor is changed in order for the processor to execute the instructions more efficiently. For example, in the case of a processor that can execute two types of instructions concurrently, the processing efficiency of the processor can be increased by supplying the processor with a sequence of alternating types of instructions. If a large number of consecutive instructions of the first type is received, the processors will be underutilized since only approximately half of the processor will be used.

Changing the order of execution of the instructions can optimize the execution of the instructions but can create other execution problems. For example, if a load instruction that depends on a preceding store instruction is moved ahead of the store instruction, this may result in the load instruction reading invalid data. It is therefore necessary to detect such dependencies in order to be able to avoid such problems.

Several techniques can be employed to detect load/store instruction dependencies and avoid the executing instructions in an order that would result in the use of invalid data. Upon successful detection of a load/store dependency, the execution of dependent instruction may be held until the execution of any instructions on which the instruction depends is complete. Many of the available techniques involve the comparison of the memory addresses referenced by younger and older instructions. If two load/store instructions are reading from and writing to the same address, a potential dependency exists between the instructions.

Performing a full address comparison on all the instructions in an instruction sequence, however, is becoming exceedingly difficult. As memory sizes increase, longer addresses are required to reference memory locations and more time is required to perform comparisons between the addresses. In addition, today's high-speed processors have critical timing specifications. In regard to pipelined processors in particular, there may be only a small amount of time between stages in the pipeline, so it may be especially difficult to perform full address comparisons between stages in the pipeline.

To overcome the timing issue, some systems perform only a partial address comparison. Since only a portion of the addresses is compared, it becomes more probable that the operation can be completed within the imposed time limits. A partial address comparison, however, can falsely identify dependencies between load/store instructions even when dependencies do not actually exist. This is because, while the compared portions of the addresses may match, the remainder of the addresses may not. If the addresses are mistakenly determined to be the same, the corresponding instructions may mistakenly be determined to be dependent, causing the later of the instructions to be suspended. As a result of the unnecessary suspension of load/store instructions caused by the false identification of the partial comparison, the efficiency of the processor is decreased.

It would therefore be desirable to provide systems and methods to reduce the number of falsely identified load/store dependencies between instructions. Moreover, it would be desirable for these systems and methods to be able to operate within the limited time between instruction stages of modern, high-speed processors without delaying the execution of instructions by the processors.

SUMMARY OF THE INVENTION

One or more of the problems outlined above may be solved by the various embodiments of the invention. Broadly speaking, the invention includes systems and methods for determining dependencies between load/store instructions in multiple phases. In a first phase, a partial comparison between the addresses of a sequence of instructions is performed. Younger instructions having potential load/store dependencies on older instructions are suspended if the partial comparison yields a match. Suspended instructions are then resumed if the address of the instructions does not match older instructions at a second phase comparison where additional portions of the addresses of the instructions are compared.

In one embodiment, a sequence of processor instructions is received containing a first load/store instruction referencing a first address and a second, older load/store instruction referencing a second address. In a first phase, a first portion of the first address is compared to a corresponding first portion of the second address. The first instruction is suspended if the first portion of the first address matches the first portion of the second address. A match indicates a potential dependence between the first and the second load/store instructions. In one embodiment, the first instruction is suspended into a holding buffer. Alternatively, the instruction may be marked as a suspended and remain in the processor's pipeline.

If the first instruction is suspended, a second portion of the suspended first address is compared to a corresponding second portion of the second address. If the second portions of the addresses do not match, the first instruction is resumed and reinstated in the instruction sequence for processing by the processor. In an alternative embodiment, the full addresses may be compared instead of only the respective second portions of the addresses.

In one embodiment, if the second portions of the addresses do not include all of the remaining portions of the addresses (i.e., if each address comprises more than the first and second portions,) a third comparison may take place. In this third comparison, a third portion of the first address is compared to a corresponding third portion of the second address. If the third portion of the first address does not match the third portion of the second address, the suspended instruction is resumed.

In one scenario, the younger instruction is a load-miss and the older instruction is a store. In one embodiment, the younger instruction is suspended when a partial comparison of the first and second addresses indicates that there may be a dependency (i.e., the partial addresses match.) A full comparison is then performed. If the full comparison of the first address to the second address yields a match (indicating a true dependency for the instruction) the younger instruction remains suspended until the older instruction is completed. An L2 read request is then made for the needed data and the younger instruction is sent back to the pipeline to be completed. If, on the other hand, the comparison indicates that the first and second addresses do not match (indicating no dependency between the two instructions), the L2 read request is made and the younger instruction is sent back into the pipeline without waiting for completion of the older instruction.

In another embodiment, an L2 read request for the data required by the younger, load-miss instruction may be made while a comparison is performed between the first address and the second address. The request for the data may be cancelled if, for example, a full comparison of the first address to the second address yields a match (indicating a true dependency for the instruction). If, on the other hand, the comparison indicates that the first and second addresses do not match (indicating no dependency between the first and second instructions), the younger instruction is reinstated for processing, and the data from the L2 read request is provided to the younger instruction when received. It should be noted that the comparison of the first and second addresses may be either a single, full comparison, or a multi-stage comparison.

Numerous additional embodiments are also possible.

The various embodiments of the present invention may provide a number of advantages over the prior art. For example, with respect to the embodiment described above, an instruction suspended due to a partial address match in a first phase match may be reinstated if a second phase comparison determines that the instructions do not match. The processing delay for the suspended instruction is thereby minimized. In addition, data required by a suspended instruction can pre-fetched while the instruction is still suspended to overlap the data latency with the suspension of the instruction and thereby increase efficiency. Similar advantages may be provided in other embodiments.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EMBODIMENTS

One or more embodiments of the invention are described below. It should be noted that these and any other embodiments described below are exemplary and are intended to be illustrative of the invention rather than limiting.

Broadly speaking, the invention comprises systems and methods for determining dependencies between load/store instructions in multiple phases. In a first phase, a partial comparison between the addresses of a sequence of instructions is performed. Younger load/store instructions having potential dependencies on older load/store instructions are suspended if the partial comparison yields a match. Suspended instructions are then resumed if a second phase comparison where additional portions of the addresses of the instructions are compared determines that the full addresses of the instructions do not match.

While the invention is widely applicable to different types of systems, it is impossible to include all of the possible embodiments and contexts of the invention in this disclosure. The present disclosure therefore focuses on a few exemplary embodiments. It should be noted that these embodiments are intended to be illustrative rather than limiting. Upon reading this disclosure, many alternative embodiments of the present invention will be apparent to persons of ordinary skill in the art. All these alternative embodiments are within the scope of the appended claims.

In one embodiment, a sequence of processor instructions is received by a pipelined processor. The instructions include a first instruction referencing a first address and a second, older instruction referencing a second address. It is possible that the first and second instructions have dependencies that would prevent the younger instruction from being executed prior to completion of the older instruction. For example, the older instruction may be a store to a particular address, and the younger instruction may be a load from that same address. If the load is performed before the store is completed, the loaded data may be incorrect. Such dependencies need to be detected, and premature execution of the younger instructions avoided, in order to prevent errors in the execution of the program.

In this embodiment, a first portion of the first address is compared to a corresponding first portion of the second address at a first stage of the pipeline. The first instruction is suspended if the first portion of the first address matches the first portion of the second address. A match indicates a potential dependence between the first and the second instruction. The first instruction is suspended into a holding buffer in one embodiment. Alternatively, the instruction may be marked as a suspended and remain in the processor's pipeline.

If the first instruction is suspended, a second portion of the suspended first address is compared to a corresponding second portion of the second address. If the second portions of the addresses do not to match, the first instruction is resumed and reinstated in the instruction sequence for processing by the processor. In an alternative embodiment, the full addresses may be compared instead of only the respective second portions of the addresses.

It should be noted that a "full" address, as the term is used herein, is a complete address for a memory location, including enough bits to identify a boundary between memory locations of a selected granularity. For instance, while a memory space may be addressable at a 1-byte granularity, the selected granularity for purposes of determining whether two load/store instructions address the same memory location may be a 32-bit word, a double-word (64 bits,) or a quad-word (128 bits.) If individual bytes are addressable with 64 bits, a full address (for purposes of this disclosure) may be 60–62 bits.

In one embodiment, if the second portions of the addresses do not include all of the remaining portions of the addresses (i.e., if each address comprises more than the first and second portions,) a third comparison may take place. In this third comparison, a third portion of the first address is compared to a corresponding third portion of the second address. If the third portion of the first address does not match the third portion of the second address, the suspended instruction is resumed.

In one embodiment, data required by the first instruction may be speculatively requested while the corresponding address is checked to determine if there is a dependency. The request for the data may be cancelled if, for example, a full comparison of the first address to the second address yields a match (indicating a true dependency for the instruction). If, on the other hand, the comparison indicates that the first and second addresses do not match (indicating no dependency between the first and second instructions), the data request is completed and the first instruction processed normally. It should be noted that the comparison of the first and second addresses may be either a single, full comparison, or a multi-stage comparison.

The various embodiments of the present invention may provide a number of advantages over the prior art. For example, with respect to the embodiment described above, an instruction suspended due to a partial address match in a first phase match may be reinstated if a second phase comparison determines that the instructions do not match. The processing delay for the suspended instruction is thereby minimized. In addition, data required by a suspended instruction can pre-fetched while the instruction is still suspended to overlap the data latency with the suspension of the instruction and thereby increase efficiency. Similar advantages may be provided in other embodiments.

Figure 1:
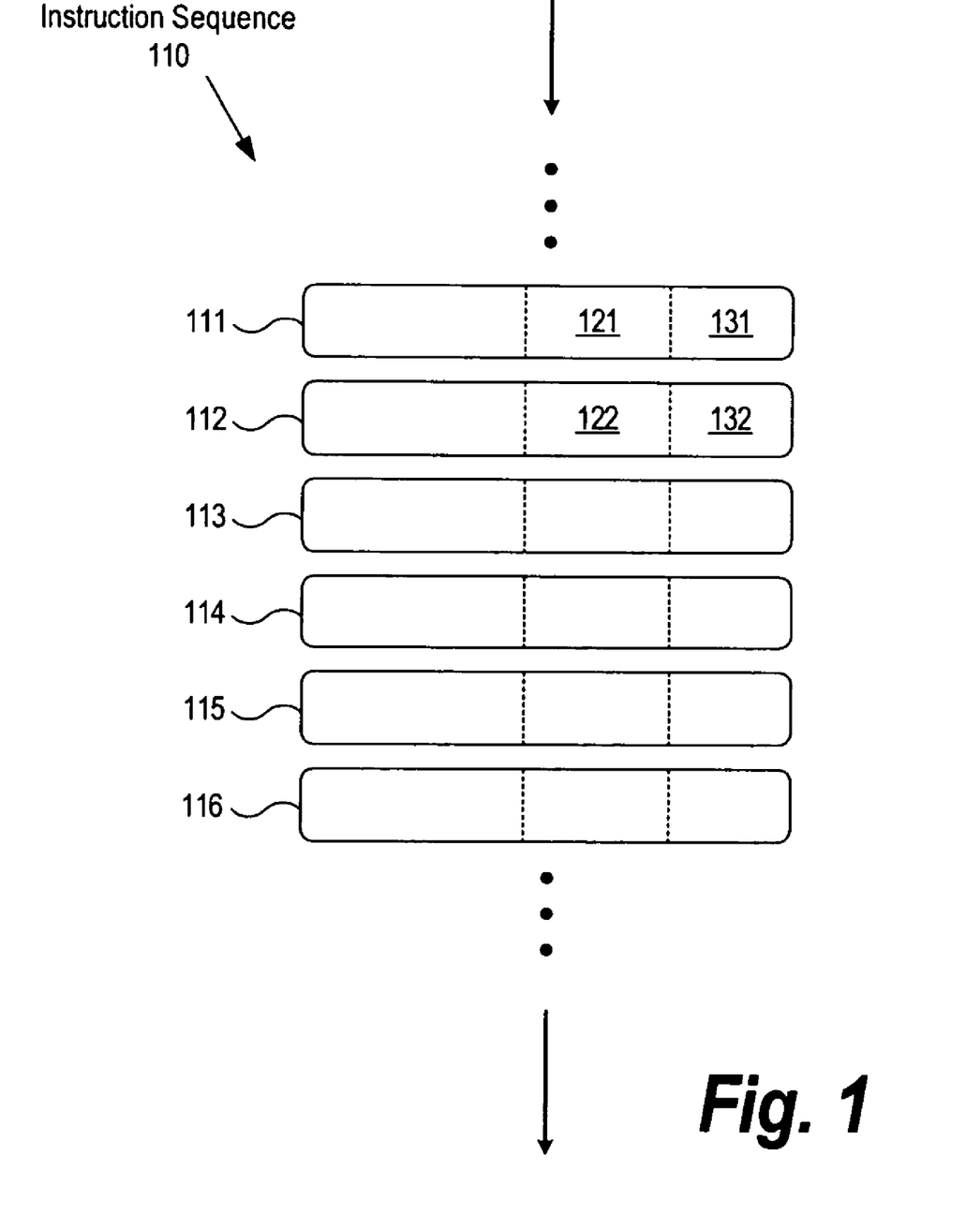
FIG. 1 is a block diagram illustrating a series of instructions referencing memory locations using addresses having first and second portions in accordance with one embodiment.

Referring to FIG. 1, a diagram illustrating a series of instructions referencing memory locations using addresses having first and second portions in accordance with one embodiment is shown. In this embodiment, instruction sequence 110 represents a group of instructions that are to be executed by a processor. The order of execution of the instructions may be rearranged to optimize the processing of the instructions. For instance, the order of execution of the instructions can be changed to position certain instructions so that execution of these instructions is completed before execution of later instructions that need the results of the earlier instructions begins. This allows the execution of the instructions to proceed without delays that might otherwise result from the need to wait for completion of the earlier instructions.

The rearrangement of instructions in instruction sequence 110 is limited, however. Typically, only a certain number of instructions can be considered at one time. There may be dependencies between instructions which are inside this "window" and instructions which are not. It may not be possible to resolve these dependencies by rearranging the instructions. Further, it may be the case that, in repositioning an instruction to reduce a delay resulting from one dependency, a delay resulting from another dependency may increase.

A first set of dependency logic is configured to detect dependencies between instructions in instruction sequence 110 by partially comparing the addresses referenced by the instructions. In one embodiment, the address of a younger instruction (e.g., 111) may be compared to the address of one of the older instructions (e.g., 112–116) to determine whether the two instructions reference the same address—an indication of a potential dependency between the instructions. Other criteria for determining dependencies may also be used in addition to comparing the addresses. For example, a younger read of a particular memory address may depend upon an older write to that memory address. A younger read of a particular memory address would not, however, depend upon an older read to the same memory address.

In one embodiment, only a first portion of each of the addresses referenced by the two instructions is compared. For instance, portion 121 of instruction 111 might be compared to portion 122 of instruction 112. By comparing only a portion of the addresses, the time required to perform the comparison is less than the time required to compare the full addresses. The comparison can therefore complete without delaying the execution of the instructions by the processor (in this embodiment, the time allowed for the comparison is the time required for the instructions to advance by one stage in the pipeline of the processor executing the instructions.) If the partial comparison shows that the first portions of the addresses do not match, there is no dependency between the two instructions and no further action is required based upon any-dependency between the instructions. If, on the other hand, the partial address comparison yields a match, indicating a potential dependency between the instructions, the dependent instruction is suspended until the dependency is resolved.

In one embodiment, the instruction is suspended by removing the instruction from instruction sequence 110 and placing the instruction in a holding buffer. The instruction can remain in the holding buffer until execution of the instruction on which it depends is completed, or until it is determined that the two instructions were falsely identified as dependent. Alternatively, the instruction may remain in the pipeline, but may be marked as suspended.

If the first portions of the addresses match, an additional address comparison is performed. In a subsequent cycle, a second portion of the address of each of the instructions is compared to determine whether there is a match between the full address of the suspended instruction and the instruction on which it potentially depends. If the second comparison does not yield a match, indicating that there is no dependency between the instructions, the suspended instruction is reinstated, and execution of the instruction is resumed. If the second comparison determines that there is a match, there is a dependency between the instructions, and the suspended instruction remains suspended until execution of the older instruction is completed.

The continuing suspension of the instruction if the second comparison indicates a match assumes that the first and second comparisons together cover the entire address (possibly excluding a few of the least significant bits, as will be explained in more detail below.) Additional comparisons may be made, however, if the two comparisons do not cover the full addresses referenced by the two instructions. Thus, the full addresses may be compared in two, three, or even more phases.

Figure 2:
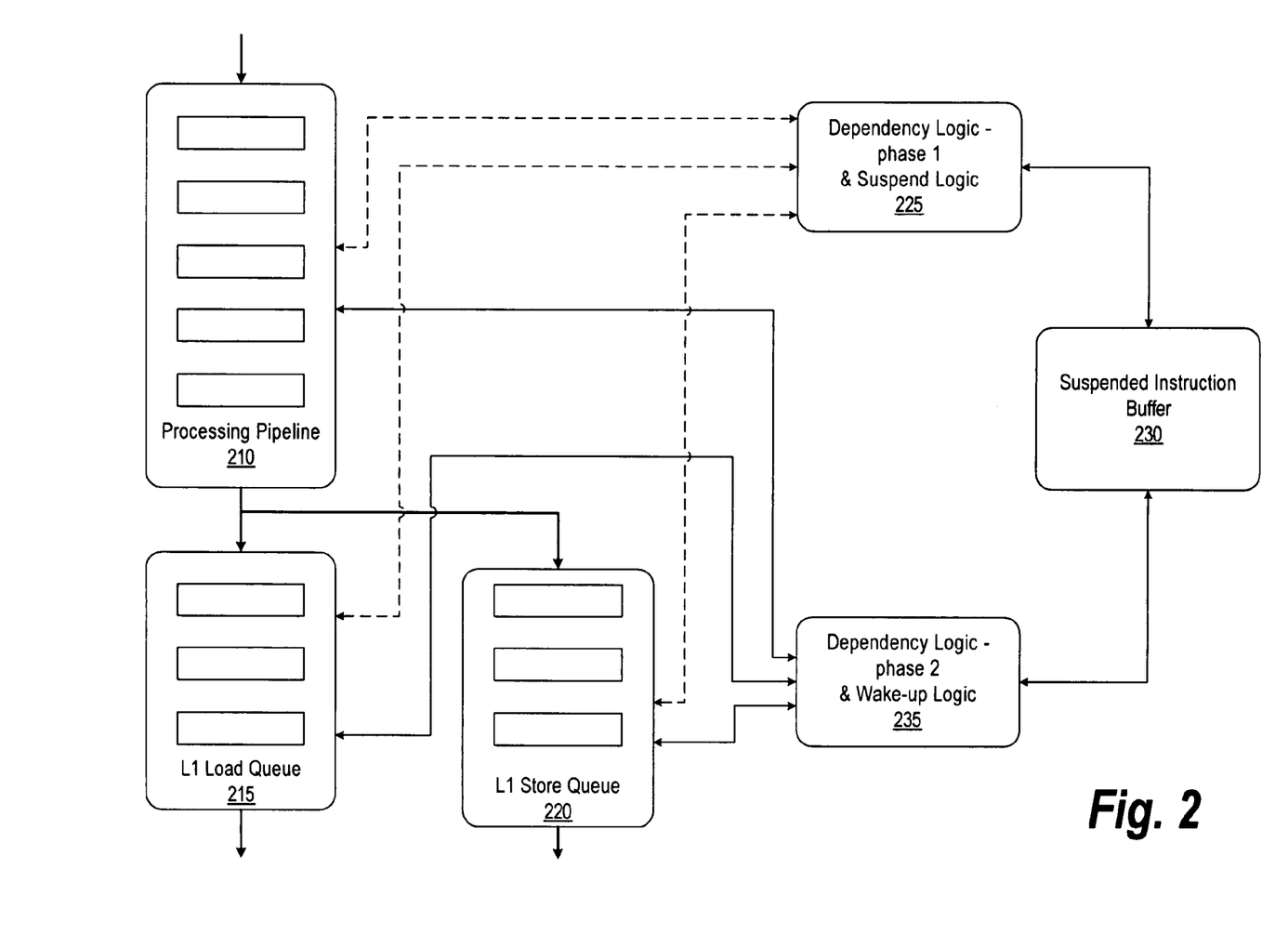
FIG. 2 is a block diagram illustrating a processor having a processing pipeline, a level-1 cache load queue, and a level-1 cache store queue and a two-phase instruction-dependency detection system in accordance with one embodiment.

Referring to FIG. 2, a block diagram illustrating a processor implementing a two-phase instruction-dependency detection system in accordance with one embodiment is shown. This processor includes a processing pipeline 210, a level-1 cache load queue 215, a level-1 cache store queue 220 and a two-phase instruction-dependency detection system. The two-phase instruction-dependency detection system includes a first set of dependency logic (and suspend logic) 225, a second set of dependency logic (and resume logic) 235, and a suspended instruction buffer 230.

Instruction Pipeline 210 contains a sequence of instructions that are in various stages of execution by the processor. L1 load queue 215 is configured to hold instructions from processing pipeline 210 that load data from the processor's level-1 cache. L1 store queue 220 is configured to hold instructions that store data to the processor's level-1 cache.

Dependency Logic—Phase 1 & Suspend Logic (DL1) 225 is configured to perform a first comparison and to detect dependencies between instructions. This involves partially comparing the addresses referenced by the instructions in pipeline 210, L1 load queue 215 and L1 store queue 220. More specifically, when an instruction enters the first pipeline stage of pipeline 210, a portion of the instruction's address is compared to a corresponding portion of the addresses for instructions in each of the later stages of the pipeline and load/store queues. DL1 225 is configured to suspend the instruction in the first pipeline stage if there is a partial match between this instruction and one of the older instructions in the later stages of the pipeline.

In one embodiment, if the instruction for which a dependency is detected is a load instruction, DL1 225 is configured to send the instruction to L1 load queue 215. If, on the other hand, if the instruction for which the dependency is detected is a store instruction, DL1 225 is configured to send the instruction to L1 store queue 220.

Dependency Logic—Phase 2 & Suspend Logic (DL2) 235 is configured to perform additional address comparisons for instructions that have been suspended in L1 store queue 215 or L1 store queue 220. In one embodiment, a second portion of the address of each instruction is compared to a corresponding portion of the address for the older instruction on which the younger instruction potentially depends. The second portions of the addresses may, for instance, include the remainders of the addresses (i.e., the portions that were not compared in the first comparison performed by DL1 225.) In an alternative embodiment, DL2 235 may perform a comparison of the full addresses of the respective instructions.

If a false dependency is detected (i.e., if the addresses of the two instructions do not match in the second phase comparison), DL2 235 is configured to reinstate the suspended instruction and to resume processing of the instruction. Otherwise, the instruction remains suspended until the execution of the instruction on which it depends is complete.

Figure 3:
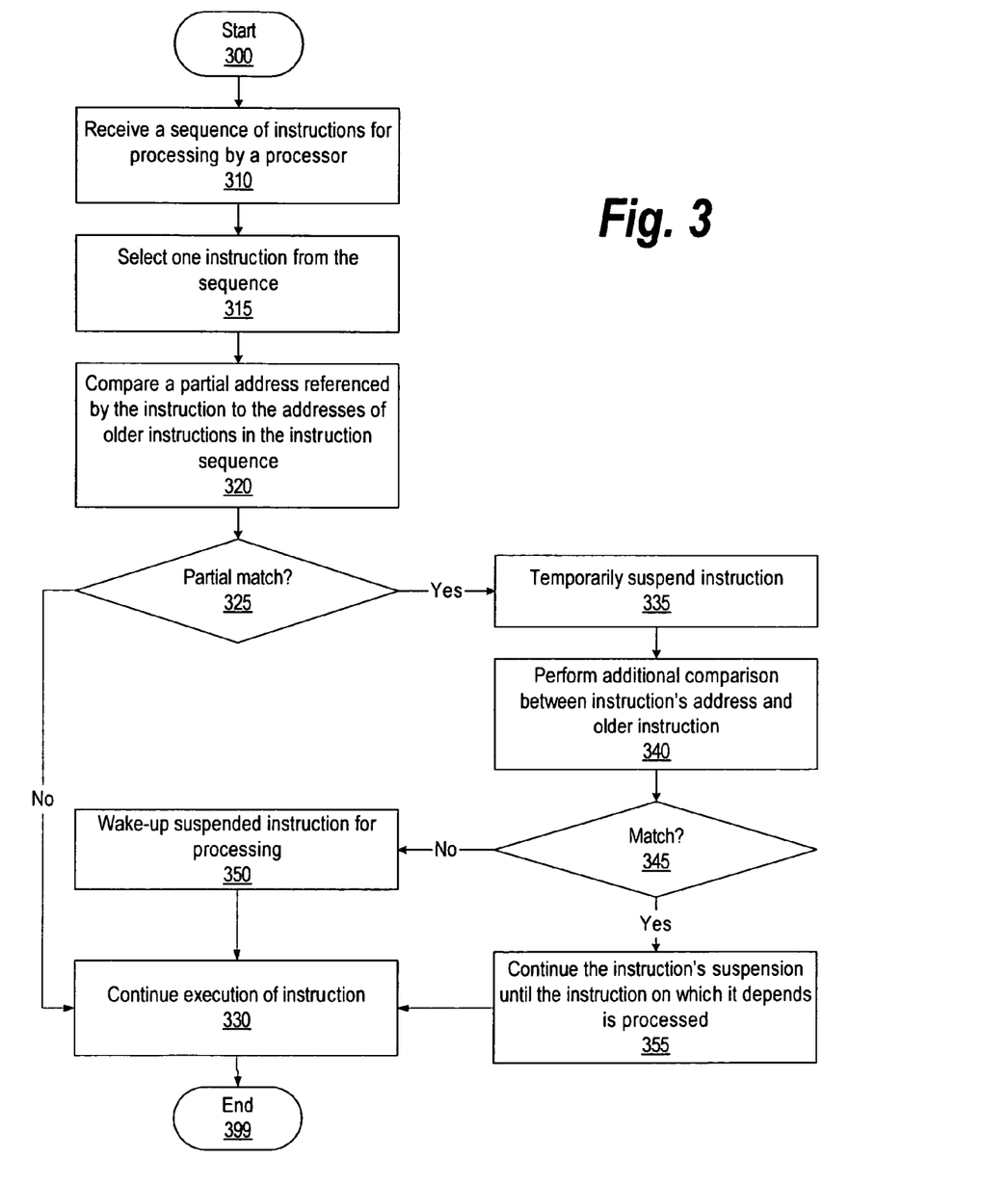
FIG. 3 is a flowchart illustrating a method for detecting instruction dependencies in two phases in accordance with one embodiment.

Referring to FIG. 3, a flowchart illustrating a method for detecting instruction dependencies in two phases in accordance with one embodiment is shown. Processing begins at 300 whereupon, at block 310, a sequence of instructions is received for execution by a processor. At block 315, one of the instructions from the received instruction sequence is selected. In one embodiment, the selected instruction is the instruction that is in the first stage of the pipeline. At block 320, a first portion of the address referenced by the selected instruction is compared to corresponding portions of addresses referenced by older instructions in the instruction sequence. In one embodiment, the first portion of the selected instruction is compared to a corresponding portion of an address referenced by the instruction in each of the later stages of the pipeline.

A determination is then made at decision 325 as to whether there is a match between the portions of the addresses of the instructions being compared. If there is not a match between the compared portions of the addresses, there is no dependency between the instructions. Decision 325 therefore branches to the "no" branch, whereupon at block 330, the execution of the younger instruction continues. At block 399, the process ends. Another instruction (e.g., the next instruction to enter the pipeline) is then selected, and the same process is performed for this instruction.

On the other hand, if there is a match between the partial addresses, there is a potential dependency between the instructions. Decision 325 therefore branches to the "yes" branch, whereupon at block 335, the instruction is temporarily suspended. The instruction may be suspended to a separate buffer, or the instruction may be marked as suspended and remain in its current buffer.

At block 340, an additional comparison is performed between portions of the suspended instruction's address and the address of the older instruction on which the suspended instruction depends. In one embodiment, the remaining portions of the addresses are compared. In an alternative embodiment, the full addresses referenced by the two instructions may be compared. In yet another alternative embodiment, less than the remaining portions of the addresses may be compared, in which case subsequent comparisons of any remaining portions of the addresses may need to be performed.

A determination is then made at decision 345 as to whether there is a match as a result of the second comparison. If there is not a match, there is no dependency, and the instruction should not have been suspended. The potential dependency indicated by the match in the first comparison (at 320–325) is actually not a dependency (this is sometimes referred to as a "fake" dependency. Decision 345 therefore branches to the "no" branch, whereupon at block 350, the instruction is reinstated. Then, at block 330, the execution of the previously suspended instruction continues and, at block 399, the process ends.

Finally, if there was a match at the second comparison, there is a dependency between the instruction and the older instruction (assuming that the comparison included the remainder of each of the addresses.) Decision 345 therefore branches to the "yes" branch, whereupon at block 355, the instruction remains suspended until the execution of the instruction on which the suspended instruction depends completes execution. If the second comparison did not include all of the remainder of the addresses, the instruction remains suspended until it is determined at additional address comparisons that there is no dependency between the suspended instruction and the older instruction, or until the instruction on which the suspended instruction depends completes execution. The suspended instruction then completes execution at block 330, and the process ends at block 399.

Figure 4:
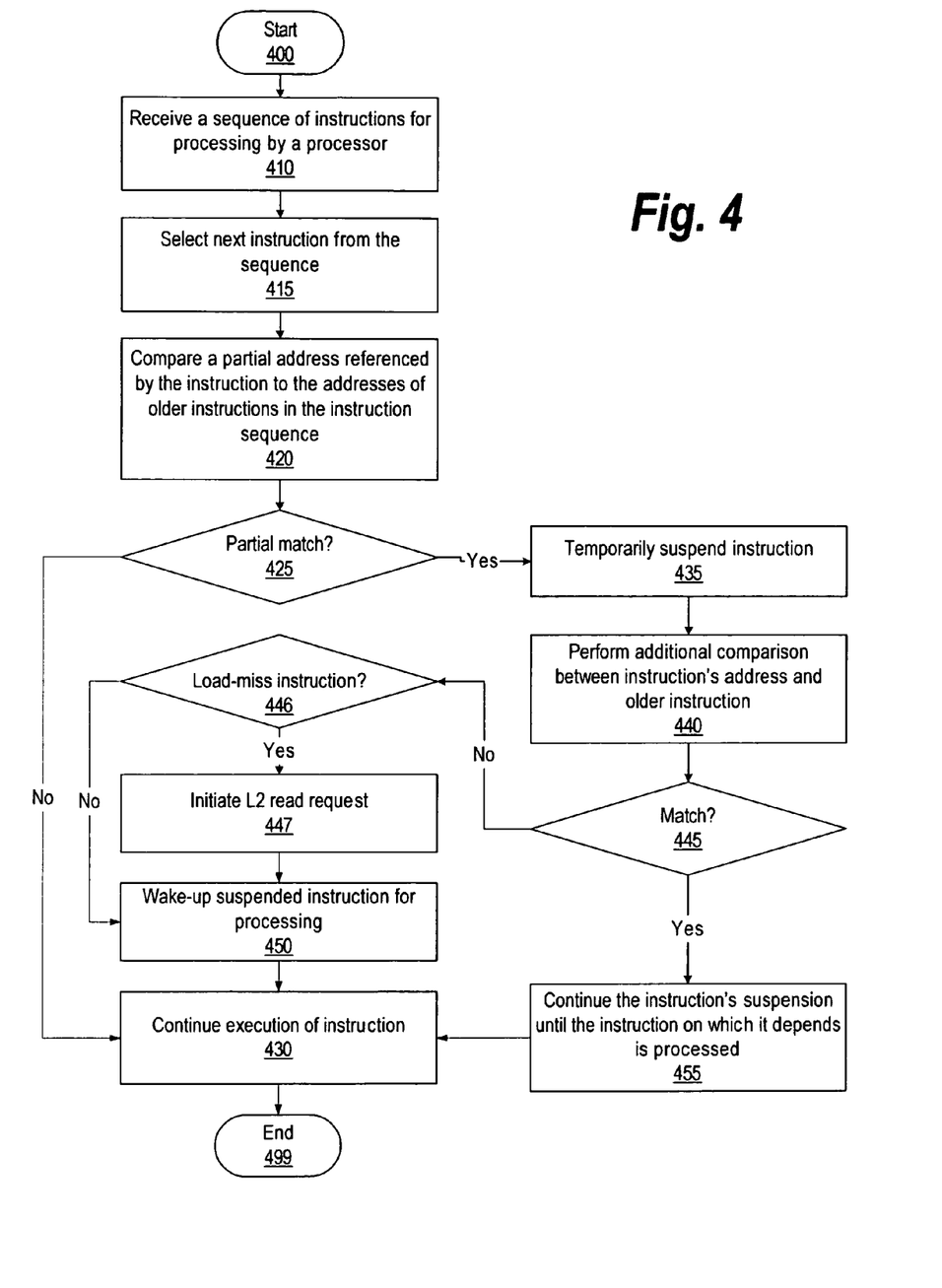
FIG. 4 is a flowchart illustrating a method for initiating a level-2 cache data request while an instruction is suspended in accordance with one embodiment.

Referring to FIG. 4, a flowchart illustrating a method for initiating a level-2 cache data request while an instruction is suspended in accordance with one embodiment is shown. Processing begins at 400 whereupon, at block 410, a sequence of instructions is received for execution by a processor. At block 415, the next instruction in the sequence is selected. In one embodiment, this instruction is the instruction in the first stage of the pipeline. At block 420, a first portion of the address referenced by the selected instruction is compared to corresponding portions of addresses referenced by older instructions in the instruction sequence. In one embodiment, the first portion of the selected instruction is compared to a corresponding portion of an address referenced by the instruction in each of the later stages of the pipeline and in one or more load/store queues.

At decision 425, a determination is made as to whether there is a match between the compared portions of the addresses. If there is not a match between the compared portions of the addresses, there is no dependency between the instructions. Decision 425 therefore branches to the "no" branch, and execution of the younger instruction continues at block 430. At block 499, the process ends. Another instruction (e.g., the next instruction to enter the pipeline) is then selected, and the same process is performed for this instruction.

If, on the other hand, there is a match between the partial addresses at block 420, there is a potential dependency between the instructions. Decision 425 therefore branches to the "yes" branch, and the instruction is temporarily suspended at block 435. The instruction may be suspended to a separate buffer, or the instruction may be marked as suspended and remain in its current buffer.

At block 440, a comparison is performed between additional portions of the suspended instruction's address and the address of the older instruction on which the suspended instruction potentially depends. In one embodiment, the remaining portions of the addresses are compared. In an alternative embodiment, the full addresses referenced by the two instructions may be compared. In yet another alternative embodiment, less than the remaining portions of the addresses may be compared, in which case subsequent comparisons of any remaining portions of the addresses may need to be performed.

A determination is then made at decision 445 as to whether the second comparison results in a match. If there is not a match, there is no dependency, so the potential dependency indicated at 420–425 is a fake dependency. Decision 445 therefore branches to the "no" branch. A determination is then made as to whether the instruction references an address not available at the level-1 cache (a load-miss,) thus requiring level-2 cache access. If the instruction is a load-miss, decision 446 branches to the "yes" branch, whereupon at block 447, the level-2 cache access (data request) process is initiated. This level-2 cache access increases efficiency by requesting the data prior to completion of the older instruction upon which the younger instruction was determined to be potentially dependent. At block 450, the instruction is reinstated and, at block 430, the execution of the previously suspended instruction continues. At block 499, the process ends. If the instruction is not a load-miss, decision 446 branches to the "no" branch where, at block 450, the instruction is reinstated. At block 430, the execution of the previously suspended instruction continues, and at block 499, the process ends.

Referring again to block 440, if there was a match at the second comparison, there is a dependency between the instruction and the older instruction (assuming that the comparison included the remainder of each of the addresses.) Decision 445 therefore branches to the "yes" branch, and the instruction remains suspended at block 455 until the execution of the instruction on which the suspended instruction depends completes execution. If the second comparison did not include all of the remainder of the addresses, the instruction remains suspended until it is determined by additional address comparisons that there is no dependency between the suspended instruction and the older instruction, or until the instruction on which the suspended instruction depends completes execution. The suspended instruction then completes execution at block 430, and the process ends at block 499.

Figure 5:
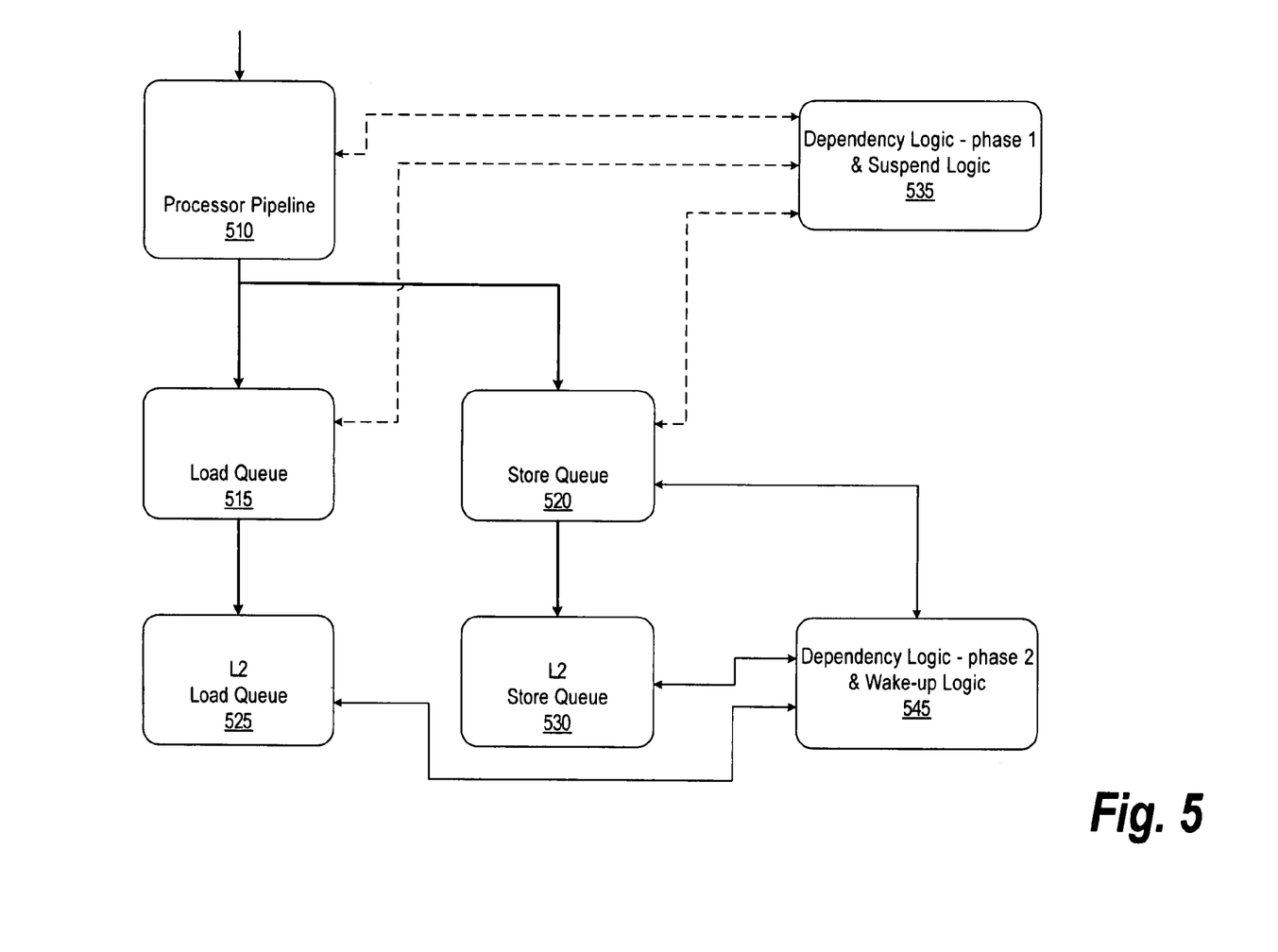
FIG. 5 is a block diagram illustrating a processor configured to initiate level-2 cache requests while an instruction is suspended in accordance with one embodiment.

Referring to FIG. 5, a block diagram illustrating a processor configured to initiate level-2 cache requests while an instruction is suspended in accordance with one embodiment is shown. In one embodiment, processor pipeline 510 holds a series of instructions that are in various stages of execution by the processor. Load and store instructions may be transferred to load queue 515 or to store queue 520, depending on the instructions' types. Load queue 515 is a level-1 cache load miss queue, which is configured to hold load-type instructions. Store queue 520 is a level-1 cache store queue which is configured to hold store-type instructions. Queue 525 is a load queue for the level-2 cache, and queue 530 is a level-2 cache store queue. When data is unavailable at the level-1 cache, an attempt is made to access the data at the level-2 cache, and a corresponding load or store instruction is entered in the respective one of queues 525 or 530.

Dependency Logic—Level 1 & Suspend Logic (DL1) 535 is configured to detect dependencies between instructions by comparing portions of the addresses referenced by the instructions. As an instruction enters the first stage of pipeline 510, it is compared to each of the other instructions in the pipeline, Load Queue and Store Queue to make a preliminary determination as to whether there is a dependency of the younger instruction on any of the older instructions.

In one embodiment, DL1 535 is configured to compare a first portion of the addresses of each pair of instructions (i.e., the instructions in pipeline stage 1 and pipeline stage 2, the instructions in pipeline stage 1 and pipeline stage 3, the instructions in pipeline stage 1 and Load (Store) queue and so on.) If the partial comparison does not yield a match, there is no dependency between the compared instructions and no further action is taken. If, on the other hand, the partial address comparison yields a match, the younger instruction is suspended until the dependency is resolved.

DL1 535 is also configured in this embodiment to determine whether a suspended instruction requires access to the level-2 cache. In one embodiment, if it is determined that a suspended requires access to the level-2 cache, DL1 535 is configured to send a corresponding data request to the level-2 cache without waiting for the potential instruction dependency to be resolved first. If it turns out that the dependency of the younger instruction upon the older instruction is a fake dependency, the younger instruction is reinstated, and execution of the instruction continues. Because the data request to the level-2 cache was made without waiting for the instruction dependency to be resolved, the data latency is shorter than in a conventional system in which the dependency is resolved before making the data request. If it turns out that there is an actual dependency of the younger instruction upon the older instruction, the data returned by the request to the level-2 cache can simply be discarded.

Dependency Logic—Phase 2 & Wake-up Logic (DL2) 545 is configured to compare additional portions of the addresses of suspended instructions to corresponding portions of the addresses referenced by instructions on which the suspended potentially depend. In one embodiment, DL2 545 is configured to perform a comparison of the remaining portions of the addresses of the suspended instruction and the instruction on which there is a potential dependency. If it is determined that the addresses do not match, there is no dependency between the suspended instruction and the older instruction. The suspended instruction is therefore reinstated and execution of the instruction is resumed. If the instruction required data from the level-2 cache, the instruction is associated with the pre-fetched data or, if the data is still pending, the instruction is associated with the pending process to fetch the data.

If it is determined that the addresses do match (assuming that the full addresses have been examined in the comparisons,) there is a true dependency between the two instructions. The suspended instruction therefore remains suspended until the instruction on which it depends completes execution. In addition, if a level-2 cache data pre-fetch process has been initiated, DL2 545 is configured to cancel the pre-fetch process.

In one embodiment, DL1 535 is configured to perform partial address comparisons on the addresses of instructions while the instructions are in pipeline 510, in load queue 515 (where load-type instructions are buffered), or in store queue 520 (where store-type instructions are stored). When a full comparison establishes a dependency for a suspended instruction, any level-2 data pre-fetch operations are cancelled.

Figure 6:
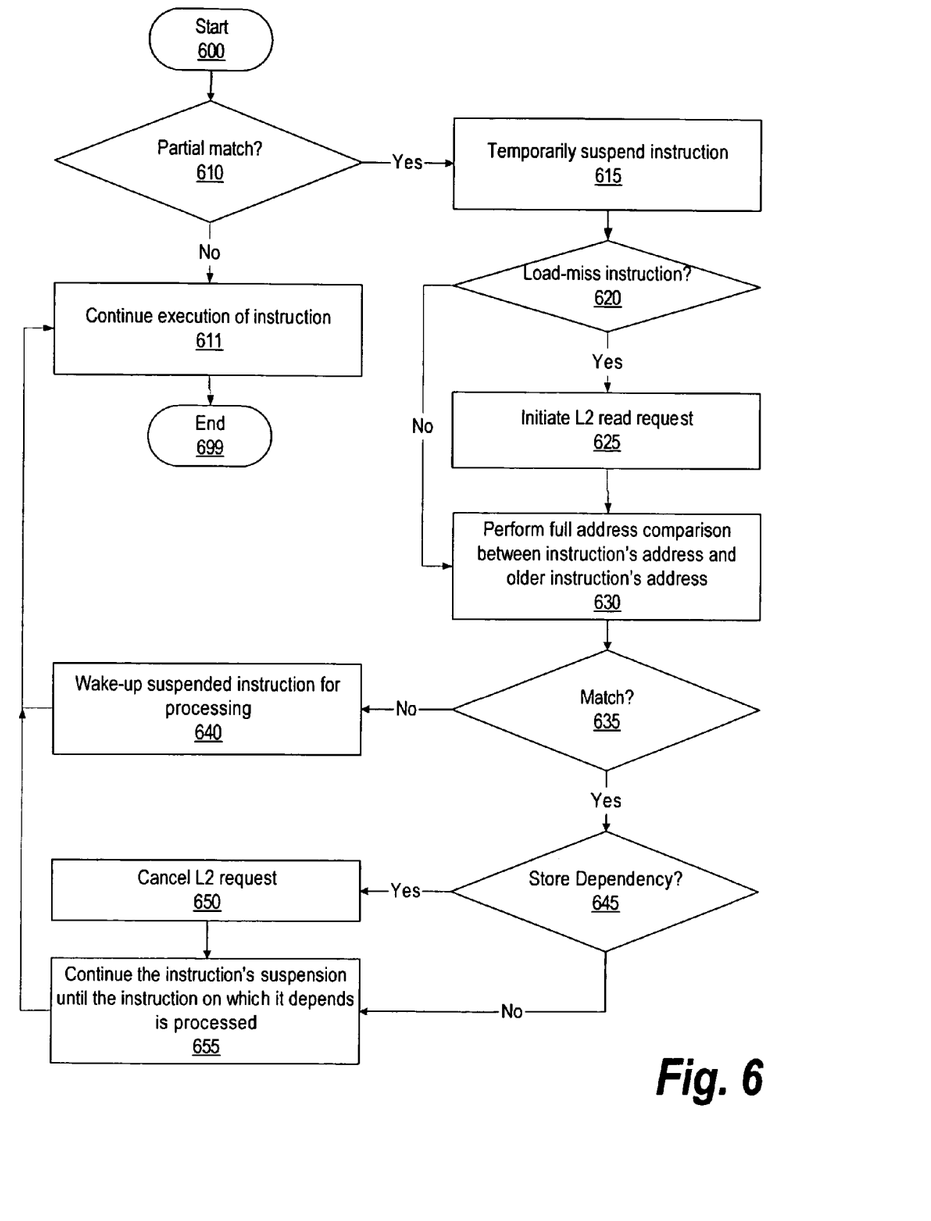
FIG. 6 is a flowchart illustrating an alternative method for initiating a level-2 cache data request while an instruction is suspended in accordance with one embodiment.

Referring to FIG. 6, a flowchart illustrating a method for initiating a level-2 cache data request while an instruction is suspended in accordance with another embodiment is shown. The flowchart in FIG. 6 represents an alternative embodiment of the flowchart in FIG. 4. The process of FIG. 6 begins at block 600 after an instruction is selected. The address of the instruction is compared to addresses of older instructions, a determination is made as to whether there was a partial address match at decision 610. If there is a partial match, decision 610 branches to the "no" branch where execution of the selected instruction continues at block 611. The process then ends at block 699.

If, on the other hand, there is a partial match, indicating a possible dependency between the selected instruction and an older instruction, decision 615 branches to the "yes" branch, whereupon at block 615, the selected instruction is suspended. Another determination is then made as to whether the instruction is a load-miss requiring level-2 cache access. If the instruction is a load-miss, decision 620 branches to the "yes" branch, whereupon at block 625, the level-2 cache data request process is initiated. The level-2 cache access process is initiated notwithstanding the fact that there may be a dependency (the partial address comparison does not guarantee a dependency). A speculative level-2 cache request, however, increases efficiency by fetching the data, earlier than the data would have been fetched after full verification of the dependency.

If, on the other hand, the instruction does not require level-2 cache access, decision 620 branches to the "no" branch where, at block 630, a full address comparison is performed to determine whether the suspended instruction depends on an older instruction. In another embodiment, one or more additional partial address comparisons may be performed instead of comparing the remainder of the full address. A determination is then made as to whether there is a full address match. If there is no match, indicating that there is no dependency between the instructions, decision 635 branches to the "no" branch, whereupon at block 640, the suspended instruction is reinstated and the execution of the instruction is resumed.

If, on the other hand, there is a match, indicating that there is a potential dependency between the instructions, decision 635 branches to the "yes" branch whereupon, at decision 645, another determination is made as to whether the detected dependency is a store-type dependency. A store-type dependency is a dependency where a load instruction requiring data from a memory location is to be executed after a corresponding store places the data into the memory location. A load-type dependency is where both instructions perform loads, in which case a dependent load being executed before the load on which it depends does not load "bad" data from the corresponding memory location.

If a store-type dependency exists, decision 645 branches to the "yes" branch whereupon, at block 650, the speculative level-2 cache data request is cancelled to prevent the dependent load instruction from loading "bad" data. The store instruction on which the load instruction depends has not yet executed and thus the data in the memory location has not yet been updated. If a store-type dependency does not exist, decision 645 branches to the "no" branch bypassing cancellation of the speculative level-2 cache data request. Processing subsequently continues as shown in the flowchart of FIG. 3.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
   first logic circuitry configured
      to compare partial addresses referenced by load/store instructions, and
      to suspend load/store instructions having potential load/store dependencies based on results of partial address matches; and
   second logic circuitry configured
      to compare at least a portion of addresses which are referenced by load/store instructions and which are not compared by the first logic circuitry, and
      to reinstate a suspended load/store instruction when a comparison by the second logic circuitry determines that an address of the suspended load/store instruction does not match an address of a load/store instruction on which the suspended load/store instruction was determined by the first logic circuitry to be potentially dependent.

2. The system of claim 1, further comprising pipeline logic circuitry coupled to the first logic circuitry and the second logic circuitry, wherein the pipeline logic circuitry is configured to execute program instructions including the load/store instructions.

3. The system of claim 2, wherein the first logic circuitry is configured to compare a partial address referenced by a load/store instruction in a first pipeline stage of the pipeline logic circuitry to partial addresses referenced by load/store instructions in each of a plurality of later pipeline stages of the pipeline logic circuitry and to partial addresses referenced by load/store instructions in each of one or more load queues and store queues.

4. The system of claim 2, wherein the pipeline logic circuitry is configured to continue execution of the load/store instructions when the first logic circuitry determines that the load/store instructions do not have potential load/store dependencies.

5. The system of claim 1, wherein the second logic circuitry is configured to compare remainders of the addresses referenced by the load/store instructions which are not included in the portions of the addresses compared by the first logic circuitry.

6. The system of claim 1, wherein the second logic circuitry is configured to compare the portions of the addresses not compared by the first logic circuitry when a suspended load/store instruction is entered in a level-1 cache store queue.

7. The system of claim 1, wherein the second logic circuitry is configured to compare the portions of the addresses not compared by the first logic circuitry when a suspended load/store instruction is entered in a level-1 cache load queue.

8. The system of claim 1, wherein the first logic circuitry is configured to suspend load/store instructions by storing the load/store instructions in a holding buffer.

9. The system of claim 1, wherein the first logic circuitry is configured to suspend load/store instructions by marking the load/store instructions as suspended and retaining the load/store instructions in a holding buffer.

10. The system of claim 1, wherein the second logic circuitry is configured to make read requests to the addresses referenced by suspended load/store instructions while the suspended load/store instructions are suspended.

11. The system of claim 10, wherein the second logic circuitry is configured to cancel read requests to the addresses referenced by suspended load/store instructions that are determined to have actual load/store dependencies.

12. The system of claim 1, wherein the suspended load/store instruction comprises a load-miss, the system further comprising third logic circuitry configured to initiate a speculative read request for data required by the suspended load-miss instruction, wherein the third logic circuitry is configured to perform one of the actions in the group consisting of:
   initiating the speculative read request upon suspension of the suspended load-miss instruction and canceling the speculative read request in response to determining that the suspended load-miss instruction has a true dependency upon an older pending load/store instruction; and
   initiating the speculative read request upon determining that the suspended load-miss instruction does not have a true dependency upon an older pending load/store instruction.

13. A method comprising:
   performing a first comparison of a first portion of a first address referenced by a first load/store instruction to a first portion of a second address referenced by a second load/store instruction;
   when the first portion of the first address matches the first portion of the second address, suspending the first instruction; and when the first instruction has been suspended, performing a second comparison of a second portion of the first address to a second portion of the second address, wherein the second portion of each address is not contained in the first portion of each address.

14. The method of claim 13, wherein the second portion of each address comprises a remainder of a full address not contained in the first portion of the address.

15. The method of claim 13, wherein the second comparison is performed for the first address when the first load/store instruction is entered in a level-1 cache store queue.

16. The method of claim 13, wherein the second comparison is performed for the first address when the first load/store instruction is entered in a level-1 cache load queue.

17. The method of claim 13, wherein suspending the first instruction comprises storing the first instruction in a holding buffer.

18. The method of claim 13, wherein suspending the first instruction comprises marking the first instruction as suspended and retaining the first instruction in a holding buffer.

19. The method of claim 13, further comprising, when the first portion of the first address does not match the first portion of the second address, continuing execution of the first instruction.

20. The method of claim 13, further comprising making a read request to the first address upon determining that the second portion of the first address does not match the second portion of the second address and prior to completion of execution of the second load/store instruction.

21. The method of claim 13, further comprising making a read request to the first address upon suspension of the first instruction and canceling the read request in response to determining that the second portion of the first address matches the second portion of the second address.

* * * * *